(12) United States Patent
Yamazaki et al.

(10) Patent No.: US 6,536,317 B2
(45) Date of Patent: Mar. 25, 2003

(54) COMPLEX MACHINING MACHINE TOOL

(75) Inventors: Tsunehiko Yamazaki, Aichi-ken (JP);
Naoe Fukumura, Aichi-ken (JP);
Masayoshi Mizukado, Gifu-ken (JP);
Kazuhiro Kikata, Gifu-ken (JP);
Sadami Miyazaki, Aichi-ken (JP);
Koichi Maki, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 34 days.

(21) Appl. No.: 09/888,290

(22) Filed: Jun. 22, 2001

(65) Prior Publication Data

US 2002/0073812 A1 Jun. 20, 2002

(30) Foreign Application Priority Data

Jun. 23, 2000 (JP) .......................... 2000-189407
Apr. 25, 2001 (JP) .......................... 2001-127731

(51) Int. Cl.[7] .............................. B23B 7/00; B23B 9/00
(52) U.S. Cl. ............................................ 82/118; 82/133
(58) Field of Search ........................ 82/118, 120, 121, 82/131; 29/26 A, 27 C, 566, 27 R; 700/160, 178

(56) References Cited

U.S. PATENT DOCUMENTS

| | | | |
|---|---|---|---|
| 4,413,539 A | * 11/1983 | Ishizuka et al. | .............. 82/2 R |
| 4,604,705 A | 8/1986 | Imanishi | .................... 364/474 |
| 4,683,626 A | * 8/1987 | Steiner | ............................ 29/40 |
| 4,855,898 A | 8/1989 | Kawamura et al. | .......... 364/391 |
| 4,922,440 A | 5/1990 | Kawamura et al. | .... 364/474.22 |
| 5,052,089 A | * 10/1991 | Gadaud et al. | ............. 29/27 R |
| 5,122,966 A | * 6/1992 | Jansen et al. | ............ 364/474.2 |
| 5,175,962 A | * 1/1993 | Pedersen | ................. 51/165.71 |
| 5,327,350 A | 7/1994 | Endo | ..................... 364/474.26 |
| 6,128,812 A | * 10/2000 | Link et al. | ...................... 29/40 |

FOREIGN PATENT DOCUMENTS

| | | | |
|---|---|---|---|
| DE | 3733298 | 4/1999 | .......... B23B/27/16 |
| EP | 0248910 | 12/1987 | .......... B23Q/15/00 |
| EP | 0511395 | 4/1992 | ......... G05B/19/403 |
| JP | 60127947 | 8/1985 | .......... B23Q/15/00 |

* cited by examiner

Primary Examiner—Jacob K. Ackun
Assistant Examiner—Jamila Williams
(74) Attorney, Agent, or Firm—Duane Morris LLP (57) ABSTRACT

A complex machining machine tool is capable of executing a plurality of kinds of machining operations on a workpiece by selectively indexing and using an insert installed on a complex tool. The complex tool is registered in a tool data file as a plurality of virtual tools capable of executing corresponding machining operations. The virtual tools include a turning tool and a milling tool. In the tool data, the angle in a B-axis direction at which the tool is positioned when the virtual tool is used is stored as a B-axis angle for each virtual tool. The tool data of the corresponding virtual tool is read out from the tool file on the basis of the programmed machining instructions, and the B-axis angle is set on the basis of the tool data so as to execute machining.

4 Claims, 13 Drawing Sheets

① TURNING DRILL
B-AXIS ANGLE:0°
INDEXING NUMBER 1

22

② OUTSIDE DIAMETER ROUGH
B-AXIS ANGLE:112°
INDEXING NUMBER 3

25

③ OUTSIDE DIAMETER FINISHING
B-AXIS ANGLE:112°
INDEXING NUMBER 4

26

④ INSIDE DIAMETER ROUGH
B-AXIS ANGLE:20°
INDEXING NUMBER 2

23

⑤ INSIDE DIAMETER FINISHING
B-AXIS ANGLE:0°
INDEXING NUMBER 4

26

⑥ MILL DRILL
B-AXIS ANGLE:90°
INDEXING NUMBER 1

22

⑦ END MILL
B-AXIS ANGLE:90°
INDEXING NUMBER 1

CASE OF TAPER SHAPE

(a)

(b)

CASE OF CIRCULAR ARC SHAPE (c)

凹 CIRCULAR ARC (d)

凸 CIRCULAR ARC (e)

COMPLEX MACHINING MACHINE TOOL

BACKGROUND OF THE INVENTION

This invention relates to a machine tool for complex machining operations using a complex tool, having installed thereon a plurality of inserts on a single holder portion, wherein the tool is capable of performing turning machining and rotational tool machining operations, such as drilling/milling machining operations, with one tool.

In a conventional machine tool, the available tools can be divided into tools for turning machining operations, versus tools for drilling/milling machining operations. For every change in the type of machining operation to be conducted, the tool installed on a tool rest may need to be exchanged. The previous tool is detached and the next tool is attached in its place, and used as necessary, for so long as that next tool is appropriate to accomplish the machining operation to be executed at that point in the sequence of operations, after which it in turn is replaced.

Thus with such a machine tool, it may be necessary to exchange tools every time that machining demands change. The time spent to exchange tools lowers machining efficiency. A recent proposal is to provide a complex tool wherein a plurality of inserts is installed on a single tool so as to save trouble during tool exchanges and thereby to improve machining efficiency.

But, it is absolutely impossible for an operator to sufficiently know the machining demands to be placed on such a complex tool in advance, at the time of composing the machining program. So, development of a machine tool capable of machining operations with a complex tool, without relying on an operator's previous knowledge of the complex tool, is desired.

The object of the present invention is to provide a complex machining machine tool facilitating use with no preliminary knowledge concerning the complex tool, taking the above-mentioned circumstances into consideration.

SUMMARY OF THE INVENTION

The invention concerns a complex machining machine tool having a tool rest capable of attachably and detachably receiving a complex tool having a plurality of inserts thereon, capable of a plurality of kinds of machining operations on a workpiece with said complex tool, by selectively indexing and using said insert when installed on said complex tool. The complex machining machine tool comprises:

a spindle, rotatably supported, and defining a Z-axis as its center;

said tool rest being free to move and drive in an X-axis direction, perpendicular to said Z-axis, and being free to rotate, position and drive in a B-axis direction, with a Y-axis perpendicular to said X-axis and Z-axis as its center;

a tool file storing tool data concerning a tool to be used in a sequence of programmed machining operations;

said complex tool registered in said tool file as a plurality of virtual tools; a plurality of said virtual tools being virtually set for each said complex tool and corresponding to machining operations that are capable of being performed with said complex tool;

said virtual tools including a turning tool and a milling tool;

said tool data being stored for every said virtual tool;

said tool data storing an angle of said B-axis direction, concerning each virtual tool at which said tool can be positioned, when said virtual tool is used to define a B-axis angle; and machining executing means operable for reading out the tool data of each corresponding virtual tool from said tool file, responsive to machining instructions identifying said virtual tool, which virtual tool is virtually defined and set for said complex tool, the machining instructions being stored in said machining program, and for executing machining operations with said virtual tool which is virtually set for the complex tool, and using the complex tool on the basis of said tool data.

According to the invention, a plurality of virtual tools is set in the tool file according to the machining capabilities of the complex tool. Then, the machining program can designate tool finishes by designating just the virtual tool to be used, and an operator can use the complex tool in a manner similar to the ways a usual tool is used, without the need to understand and be conscious of the complex tool.

The angle in the B-axis direction at which the tool is positioned when the virtual tool is used, is stored as the B-axis angle for each virtual tool. It is not necessary to set the B-axis angle when an operator commences use of the virtual tool, making it easy for the operator to use the complex tool.

According to another aspect of the complex machining machine tool, a tool length for the complex tool can be stored and applicable for each insert.

Preferably, the tool length is stored for each insert. Then, the tool length can be maintained regardless of the machining sequence, such as milling and turning with the insert. So, maintenance is easy.

An interference judging means can be provided for judging whether or not interference will occur between a workpiece to be machined and each said virtual tool. This can involve simulating the machining program to be executed. A B-axis angle changing means is provided for changing and setting the B-axis angle, so as to shift the B-axis angle applicable to the virtual tool, based on the B-axis angle stored in said tool data. The angle is modified by a predetermined amount and direction by which said complex tool is displaced from said workpiece in case where the interference judging means predicts a position conflict between said workpiece to be machined and said each virtual tool. According to another aspect, the B-axis angle changing means changes and sets the B-axis angle (the angle of ④ in FIG. 10) for the virtual tool as stored in the tool data, so as to shift by a predetermined amount in the direction by which the complex tool is spaced from the workpiece, in a case where interference is predicted (for instance, the cases as shown in FIGS. 11(a) (c), (d)). If the workpiece and the tool are predicted to interfere with each other when using the complex tool, the B-axis angle is changed so as automatically to avoid the interference. Therefore, an operator can execute required machining operations without concern as to the B-axis angle of the complex tool 21.

A maximum shifting quantity can be set for the amount by which the B-axis angle can be permitted to be shifted by said B-axis angle changing means. The B-axis angle then is controlled so as not to shift more than said maximum shifting quantity.

In a case where the B-axis angle is not permitted to be shifted beyond a maximum shift quantity, and a situation occurs that would result in the B-axis angle being shifted by more than the predetermined quantity, such a function as the virtual tool can be avoided in programming or omitted, and proper machining can be continued.

DESCRIPTION OF THE PREFERRED EMBODIMENTS

Figure 1:
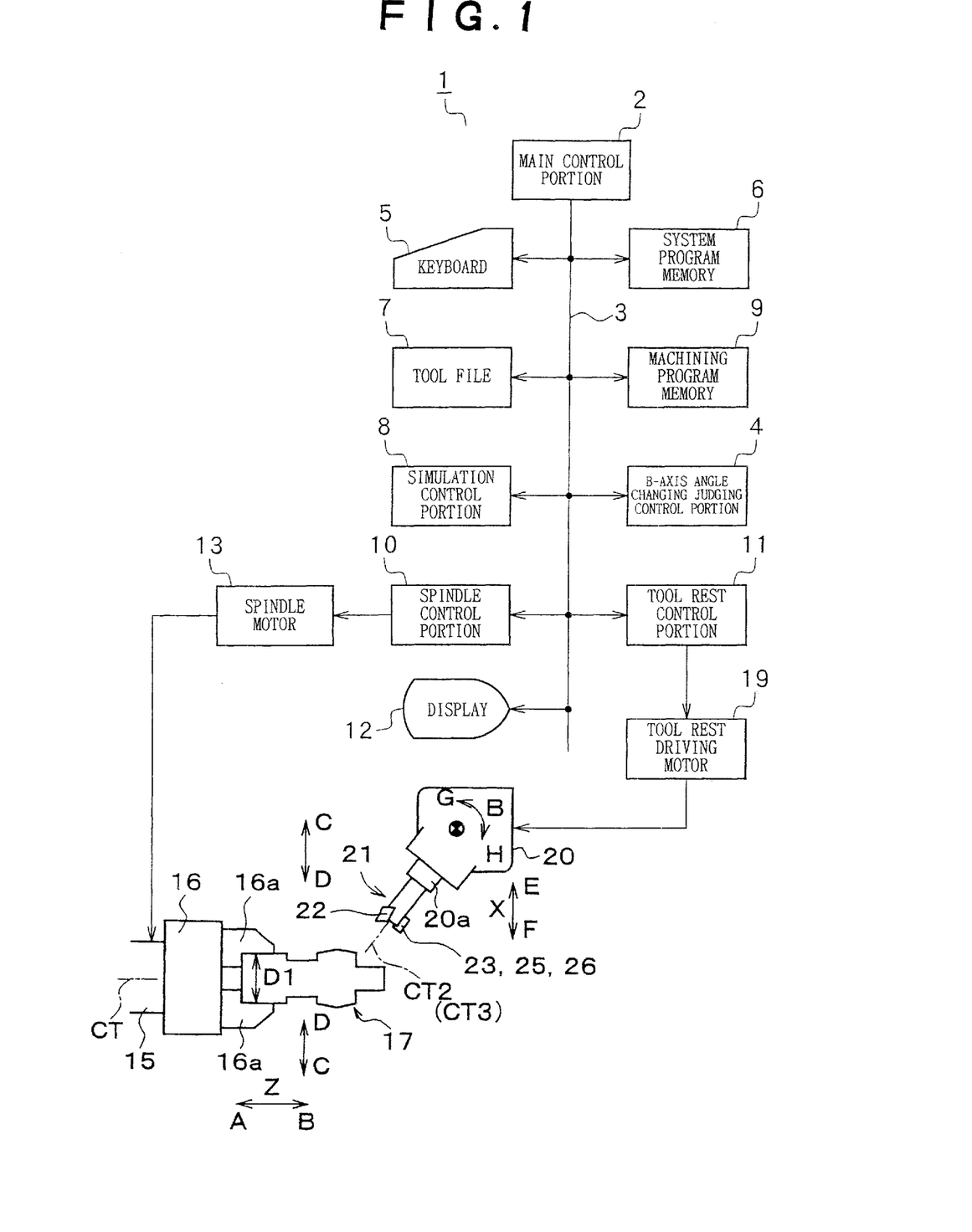
FIG. 1 is a control block diagram showing an example of a complex machining machine tool to which the present invention is applied.

A complex machining machine tool 1 has a main control portion 2, as shown in FIG. 1. Connected with the main control portion 2, are an input portion, such as a keyboard 5, a system program memory 6, a tool file 7, a simulation control portion 8, a machining program memory 9, a B-axis angle changing judging control portion 4, a spindle control portion 10, a tool rest control portion 11 and a display 12. These are connected through a bus line 3. A spindle motor 13 is connected with the spindle control portion 10. A spindle 15 is connected with a spindle motor 13, the spindle 15 being free to rotate, drive and position with an axial center CT defined parallel to the Z-axis as its center. With the spindle 15, a chuck 16 is provided. Claws 16a are provided with the chuck 16, being free to hold and release a workpiece 17 to be machined, and being free to move and drive in the direction as shown by arrows C and D.

Tool rest driving motors 19 (the plural number) are connected with the tool rest control portion 11. A tool rest 20 is connected with the tool rest driving motor 19, and is free to move and drive in the Z-axis direction and in the direction as shown by arrows E and F, orthogonal to the Z-axis, that is, in the X-axis direction, under power of the tool rest driving motor 19. Furthermore, the tool rest 20 is free to move and drive under power of the tool rest driving motor 19, in the Y-axis direction, orthogonal to the X-axis and Z-axis (perpendicular to the plane of the paper illustration), and in the direction as shown by arrows G and H, which is the B-axis direction with the Y-axis as its center.

A tool holding portion 20a is formed on the tool rest 20. A turning tool, a milling/drilling tool, and a complex tool 21 capable of turning and milling/drilling machining operations are provided with the tool holding portion 20a, and are free to be attached, detached and exchanged. The tool holding portion 20a is provided to fix and hold the complex tool and other tools in a predetermined holding state, and is free to rotate, drive and position the respective tools around axial center CT2.

Figure 3:
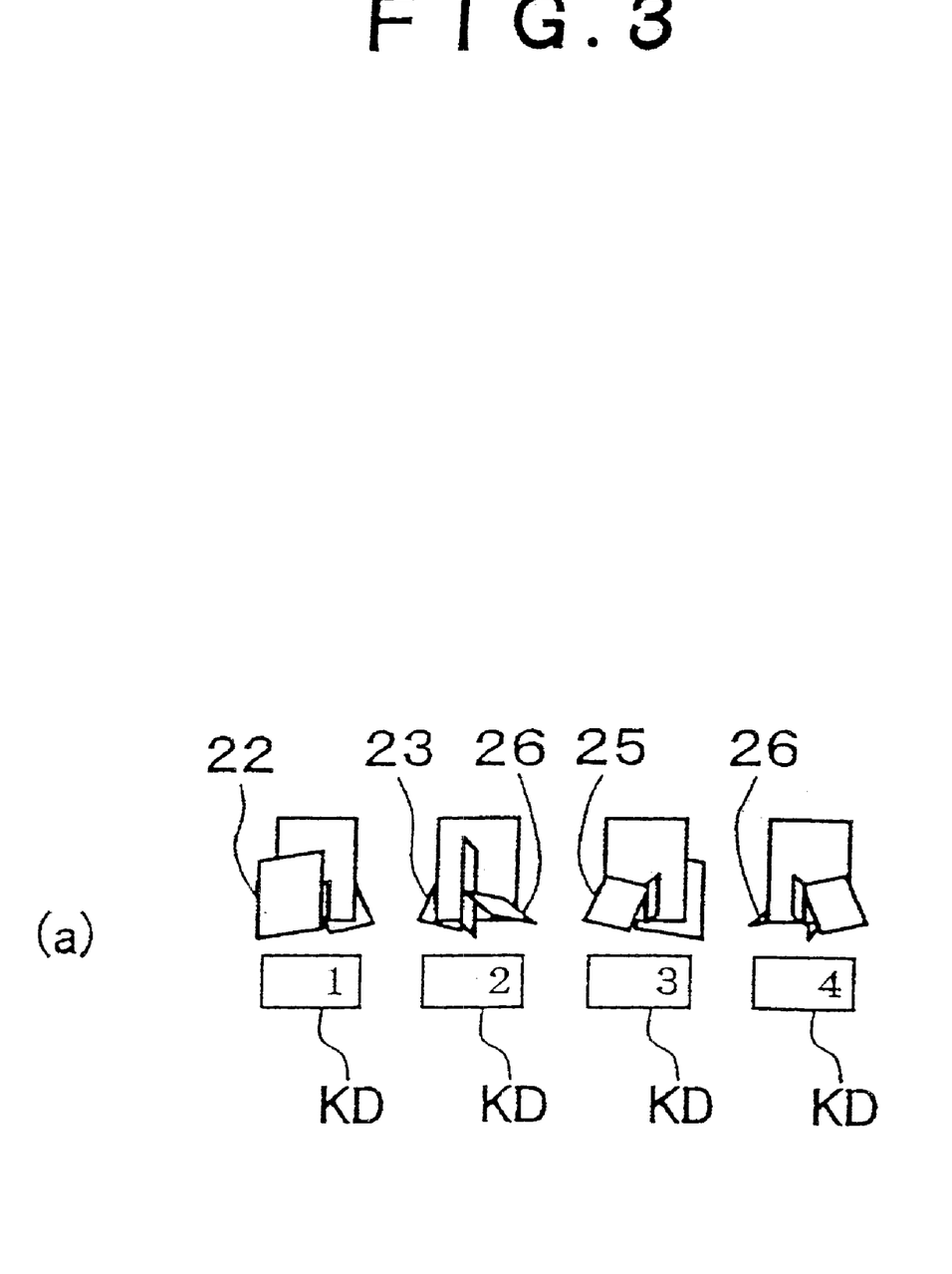
FIGS. 3a–3c is a typical view for explaining an example of tool data stored in a tool file and its contents.
Figure 4:
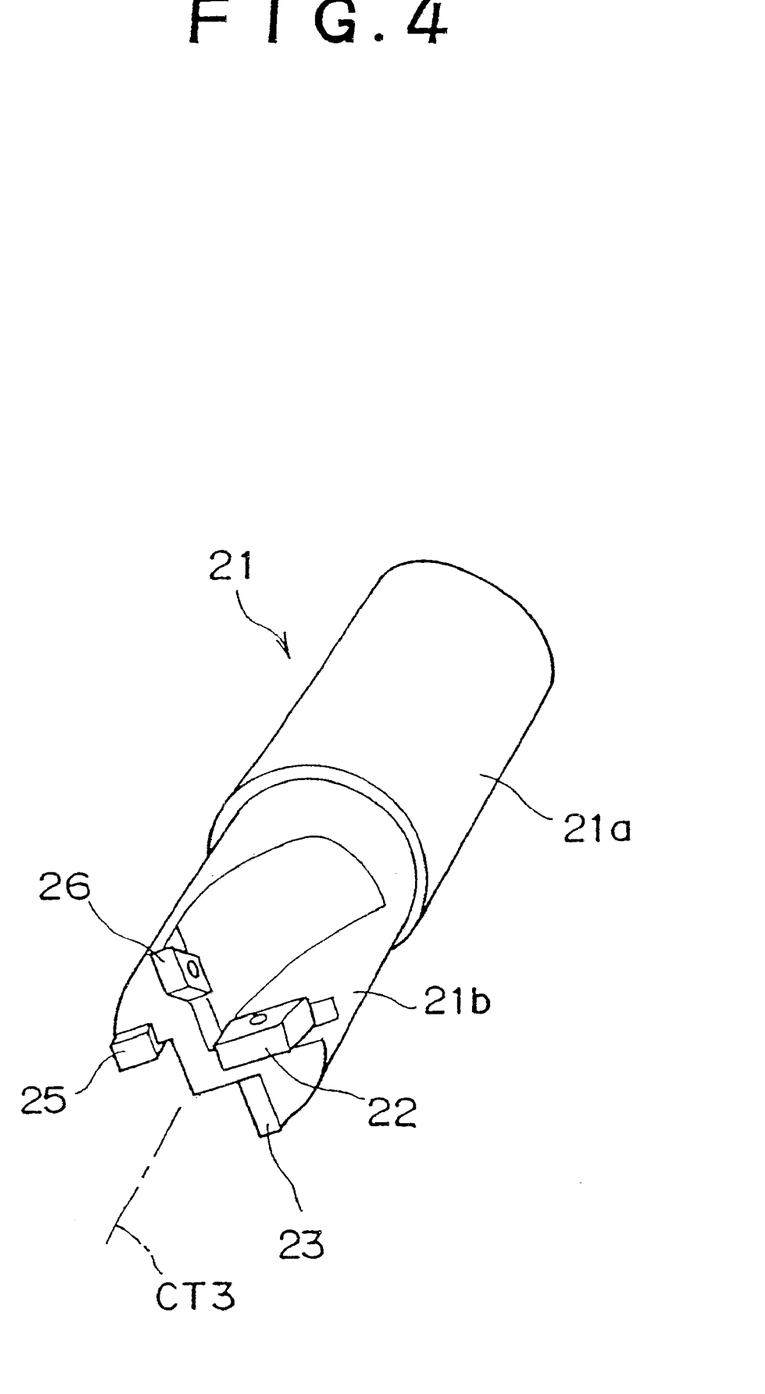
FIG. 4 is a view obliquely showing an example of a complex tool.

The complex tool 21 has a main body 21a formed in round bar shape, as shown in FIG. 4. On the top of the main body 21a, an insert installation portion 21b is formed. Four inserts 22, 23, 25 and 26 are respectively installed on the insert installation portion 21b at the pitch of 90° with axial center CT3 of the main body 21a as its center so as to attach and detach. As shown in FIG. 3(a), indexing number KD is set for each insert. The indexing number KD is set as 1 for the insert 22, and clockwise, the indexing number KD is 2 for the insert 23, the indexing number KD is 3 for the insert 25 and the indexing number KD is 4 for the insert 26.

A tool name is allotted to the respective inserts 22, 23, 25 and 26 as a virtual tool, according to the machining operations that can be performed with the complex tool 21. For the insert 22 which indexing number KD is 1, for example, there are three kinds of tool name: ① turning drill for performing a drilling machining operation wherein the tool itself does not rotate, ⑥ milling drill for performing a drilling machining operation wherein the tool itself rotates and ⑦ end mill for performing a milling machining operation. Each is a selectable virtual tool, as shown in FIG. 3(c). For the insert 23 which indexing number KD is 2, tool name NA, there is ④ an inside diameter rough machining tool for performing a rough machining turning operation on an inside diameter. For the insert 25 which indexing number KD is 3, tool name NA, there is ② an outside diameter rough machining tool for performing a turning rough machining operation on an outside diameter. For the insert 26 which indexing number KD is 4, tool name NA, there are ③ an outside diameter finishing for performing turning finishing machining on an outside diameter and ⑤ an inside diameter finishing tool for performing turning finishing machining on an inside diameter. These respective devices are each defined as a virtual tool.

Figure 2:
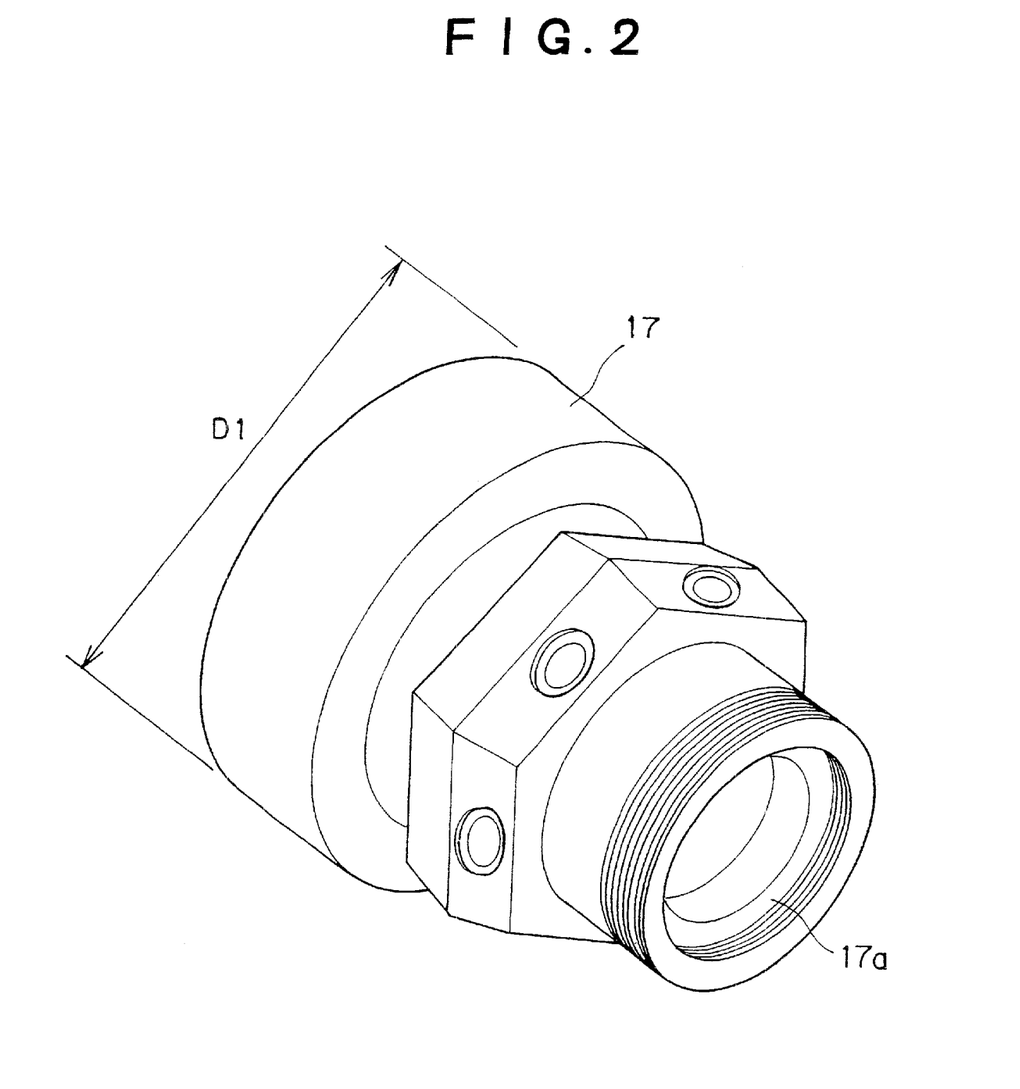
FIG. 2 is a view obliquely showing an example of a workpiece to be machined.

The complex machining machine tool 1 has the beforementioned structure. Then, in order to machine the cylindrical workpiece 17 which diameter is D1, for instance, as shown in FIG. 2, an operator inputs various kinds of machining data by a known automatic programming method, such as operating a keyboard 5 so as to compose a machining program. The main control portion 2 can compose the machining program PRO by compiling or interpreting the various kinds of data input by an operator according to a known automatic program composing program stored in the system program memory 6. The machining program PRO that has been composed is stored in the machining program memory 9.

After the machining program PRO for the workpiece 17 is composed, an operator instructs the main control portion 2 to execute the program, i.e., to machine the workpiece 17, by one or more instructions entered via the keyboard 5. Receiving this instruction, the main control portion 2 reads out the machining program PRO for the workpiece 17 from the machining program memory 9. Thus the tool executes the programmed sequence of machining operations, appropriately driving the spindle control portion 10 and the tool rest control portion 11.

Figure 5:
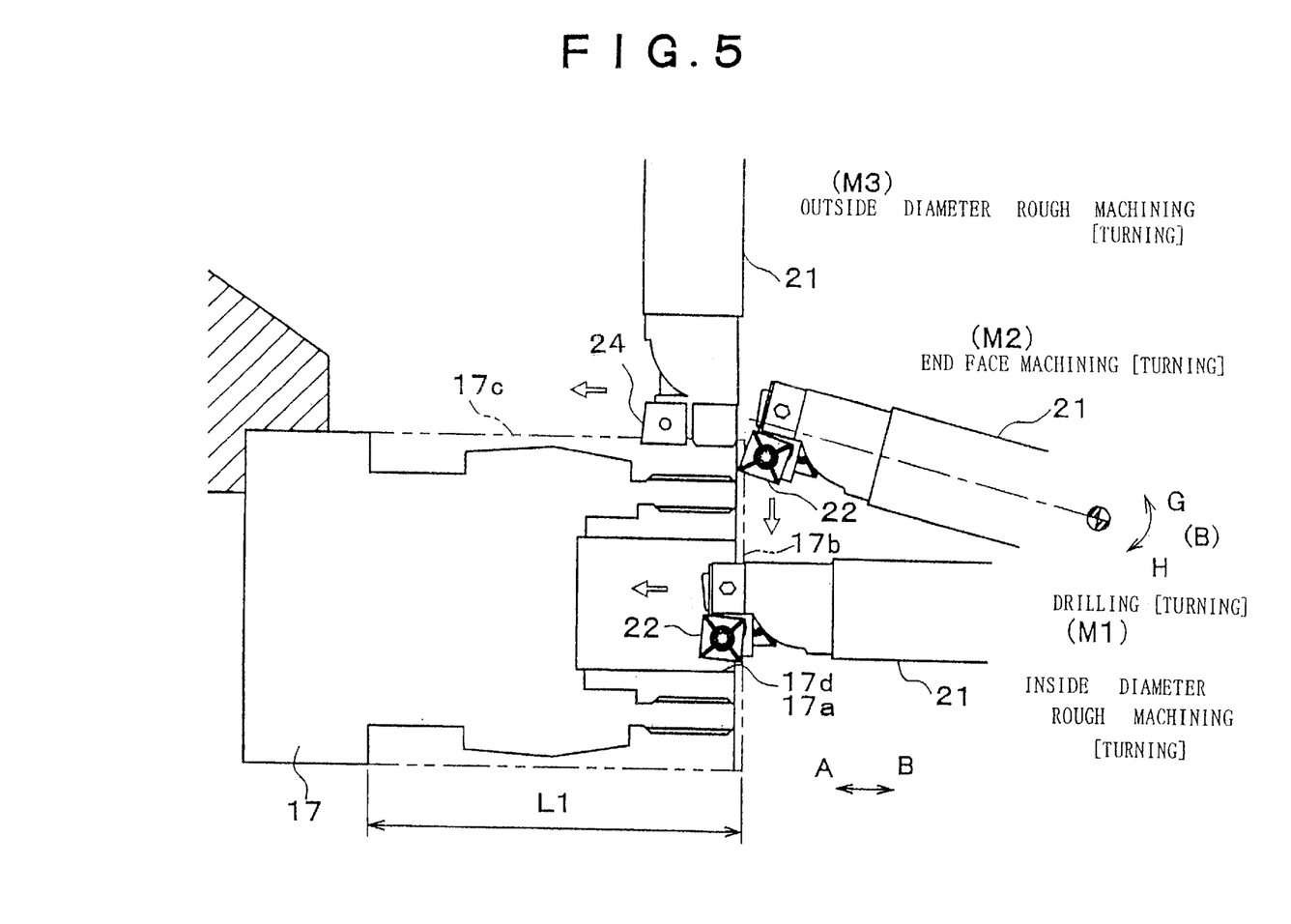
FIGS. 5, 6, 7, and 8 are views showing details when the workpiece as shown in FIG. 2 is machined with the complex tool.

In the example shown at (M1) of FIG. 5, a first machining operation on the workpiece 17 is to form a hole 17a on the central portion of the workpiece 17 using a drill. The tool to be used at this time is designated by the machining program PRO. The main control portion 2 refers to the tool file 7 when the tool to be used is designated by the machining program PRO, and reads out the tool data TL for the corresponding tool.

In the tool file 7, tool number TN, tool setting direction DR, tool name NA, nominal diameter/tool angle CA, suffix DC, rotational direction/tool character RT, tool diameter/tool edge R DM, finishing machining/rough machining division RF of the tool data DAT are set for each tool as chart data DAT1, as shown in FIG. 3(b). Additional detailed data concerning each tool is stored as detailed data DAT2.

The complex tool 21 is defined as an independent tool in this tool file 7, and is divided into a plurality of virtual tools according to the machining operations of which the complex tool 21 is capable. For instance, seven virtual tools, on which a tool name NA and the suffix DC from ① to ⑦ mentioned before are associated, can be defined and stored as the tool number TN 1 (the example of FIG. 3(b) is one example, and could be extended to many kinds, each having defined virtual tools registered to a stored tool name NA and suffix DC according to the respective tool kind). That is, every machining operation allotted to the respective inserts 22, 23, 25, 26 of the complex tool 21, has associated tool data of the inserts 22, 23, 25, 26 for performing the machining operations, is stored in the tool file 7, each of the respective inserts being defined as an independent tool. For instance, the virtual tools ① through ⑦ corresponding to each virtual tool name NA as shown in FIG. 3(c) are stored, corresponding to ① through ⑦ in FIG. 3(b).

For example, the virtual tool of ① turning drill of FIG. 3(c) is registered in such a manner that tool number Tno is 1, tool setting direction is ←, tool name NA is DRL EDG, nominal diameter/tool angle CA is 180, suffix DC is A, rotational direction/tool character RT is right rotation, and tool diameter/tool edge R DM is 50, as shown in ① of FIG. 3(b). In this example, tool setting direction DR shows the tool direction as a default value by the direction of an arrow, "←" indicating the direction wherein the direction of the tool is parallel to the Z-axis, that is, the B-axis angle is 0°, and "↓" shows the direction wherein the direction of the tool is parallel to the X-axis, that is, the B-axis angle is 90°.

The virtual tool of ② outside diameter rough machining of FIG. 3(c) is registered in such a manner that tool number TNo is 1, tool setting direction DR is ↓, tool name NA is GNL OUT, nominal diameter/tool angle CA is 75, suffix DC is B, rotational direction/tool character RT is left hand/right rotation, tool diameter/tool edge R DM is 0.4, finishing machining/rough machining division RF is R (rough machining), as shown in ② of FIG. 3(b). The virtual tool of outside diameter finishing machining of FIG. 3(c) is registered in such a manner that tool number TNo is 1, tool setting direction DR is ↓, tool name NA is GNL OUT, nominal diameter/tool angle CA is 40, suffix DC is C, rotational direction/tool character RT is right hand/left rotation, tool diameter/tool edge R DM is 0.2, finishing machining/rough machining division RF is F (finishing machining), as shown in ③ of FIG. 3(b).

Furthermore, the virtual tool ④ inside diameter rough machining tool of FIG. 3(c) is registered in such a manner that tool number TNo is 1, tool setting direction DR is ←, tool name NA is GNL IN, nominal diameter/tool angle CA is 75, suffix DC is D, rotational direction/tool character RT is right hand/left rotation, tool diameter/tool edge R DM is 0.4, finishing machining/rough machining division RF is R (rough machining), as shown in ⑤ of FIG. 3(b). The virtual tool of ⑤ inside diameter finishing machining of FIG. 3(c) is registered in such a manner that tool number TNo is 1, tool setting direction DR is ←, tool name NA is GNL IN, nominal diameter/tool angle CA is 40, suffix DC is E, rotational direction/tool character RT is right hand/left rotation, tool diameter/tool edge R DM is 0.2, finishing machining/rough machining division RF is F (finishing machining), as shown in ⑤ of FIG. 3(b).

The virtual tool of ⑥ mill drill of FIG. 3(c) is registered in such a manner that tool number TNo is 1, tool setting direction DR is ↓, tool name NA is drill, nominal diameter/tool angle CA is 50, suffix DC is H, rotational direction/tool character RT is left direction, as shown in ⑥ of FIG. 3(b).

The virtual tool of ⑦ end mill of FIG. 3(c) is registered in such a manner that tool number TNo is 1, tool setting direction DR is ←, tool name NA is end mill, nominal diameter/tool angle CA is 50, suffix DC is J, rotational direction/tool character RT is right direction and tool diameter/tool edge R DM is 50, as shown in ⑦ of FIG. 3(b).

The virtual tools having been registered, in the machining program PRO, as a tool arises that is to be used in the machining program PRO, the tool name NA and the suffix DC of the corresponding virtual tool are designated. Although the complex tool 21 is to be used in the machining, the designation of a virtual tool is similar to the designation of a normal tool in a conventional sequence or tool operations. In case of the machining (M1) for forming the hole 17a on the central portion of the workpiece 17 as shown in FIG. 5 as mentioned before, the virtual tool of ① turning drill of the complex tool 21 is used as a tool. So, in this designation, the tool name NA "DRL EDG" and the suffix DC "A" are input in the machining program PRO, similar to a normal tool designation. By doing so, the tool designation finishes only by acknowledging and designating each virtual tool in the tool file 7 by the operator, who need not understand the whole complex tool 21 in order to compose the machining program PRO. It is possible to compose the machining program PRO with no specific knowledge concerning the complex tool 21. The main control portion 2 searches the tool data DAT of the tool file 7 so as to select the corresponding tool called up by the operator, that is, the virtual tool wherein the tool number TNo as shown in ① of FIG. 3(b) is 1 and tool name NA is "DRL EDG" and suffix DC is "A" as shown in the example on the most upper hand of the figure, and instructs the tool rest control portion 11 to index the tool into the machining position. In the tool file 7, the respective tools (including ① through ⑦ as "virtual tool" regarded seven independent tools of the complex tool 21) are differentiated by tool name NA and suffix DC concerning turning machining related tool (in case of the same tool name NA, it is differentiated by changing suffix DC into "A", "B", "C", "D" and "E"), and are differentiated by tool name NA and nominal diameter/tool angle CA concerning the milling machining related tool. The differentiations permit the selection and use of individual tools, regardless of the fact that the individual tools are elements of the complex tool 21. When tool name NA and suffix DC or tool name NA and nominal diameter/tool angle CA are designated in the machining program PRO, the corresponding tool is immediately determined and can be deployed.

The tool rest control portion 11 drives the tool exchanger (not shown), and selects the complex tool 21 which tool number TNo is 1 from the tool magazine (not shown) so as to install it on the tool rest 20. When the complex tool 21 is installed on the tool rest 20, the tool rest control portion 11 refers to the detailed data DAT2 corresponding to ① turning drill from tool name NA and suffix DC designated in the machining program PRO, and reads out the indexing number KD concerning ① turning drill and the B-axis angle ANG of the complex tool 21 shown in the detailed data DAT2.

As shown in FIG. 3(b), tool data, similar to data associated with a normal turning tool and/or milling tool, is stored for each virtual tool in the detailed data DAT2. In the detailed data DAT2 concerning each virtual tool, more detailed tool data is stored, for instance, tool length in X-axis and Z-axis direction TL, indexing number KD and B-axis angle ANG as default value. In addition to the above-mentioned tool name NA, nominal diameter/tool edge angle CA, suffix DC, rotational direction/tool character RT, tool diameter/tool edge R DM, and finishing machining/rough machining division RF can be stored.

The respective inserts 22, 23, 25, 26 are fixedly provided with respect to the main body 21a. The tool length TL, measured for a given virtual tool using an insert, can be also used for other virtual tools using this insert. That is, even if B-axis angle ANG or indexing number KD of the complex tool using the same insert may be different, the change of the tool length TL based on the difference is caused only by a change of rotational angle with the B-axis and the axial center CT2 as their center. Thus, for a virtual tool having another B-axis angle ANG or other indexing number KD, but which virtual tool uses the same insert, its tool length can be geometrically easily computed from that of the previously stored value for the insert. Therefore, the tool length TL measured for one virtual tool, using the same insert, can be also used as the input data for the other virtual tool using the insert.

The tool rest control portion 11 drives and controls a tool driving motor (not shown) built in the tool rest. The drive and control is accomplished on the basis of the indexing number KD and the B-axis angle ANG concerning the read ① turning drill so as to rotate the complex tool 21 around its axial center CT3 and to position it in the state that the indexing number KD is 1. The state that the indexing number 1 is positioned is the state that the insert 22 is positioned facing upwards in the figure (in the Y-axis direction), as shown in FIG. 3(a). The tool rest 20 is moved and driven in the direction as shown by the arrows G and H with the Y-axis as its center by driving the B-axis driving motor (not shown) so as to position the complex tool 21 parallel to the Z-axis, which corresponds to a B-axis angle position of 0°, as shown in FIG. 3(c). In this state, the spindle 15 is rotated and driven by the spindle driving motor 13 at a predetermined rotational speed and the complex tool 21 is moved and driven in the direction by the arrow A of the Z-axis direction so as to accomplish the machining and forming operations resulting in the hole 17a of a predetermined depth on the rotating workpiece 17 by the insert 22, as shown in FIG. 5(M1).

Continuing with the example, an end face 17b of FIG. 5(M2) is to be machined by the insert 22 of the complex tool 21. In this case, the tool rest control portion 11 drives the B-axis driving motor with ① turning drill tool being selected, so as to rotate and drive the tool rest 20 a predetermined angle in the direction as shown by the arrow H of B-axis (that is, the B-axis angle ANG is changed). Then, the complex tool 21 is held, slightly inclined with respect to the Z-axis, and the end face 17b of the workpiece is machined by the same insert 22, as shown in FIG. 5(M2).

Next, rough machining is performed on an outside diameter 17c of the workpiece 17 of FIG. 5(M3) by the complex tool 21. In this case, the virtual tool is designated by inputting "GNL OUT" as tool name NA, "B" as suffix DC in the machining program PRO. Then, main control portion 2 searches the tool data DAT of the tool file 7, and selects the corresponding tool, that is, the virtual tool which tool name NA is "GNL OUT" and the suffix DC is "B", shown on the second from the upper of the figure which tool number is 1 as shown in ② of FIG. 3(b). The main control portion instructs the tool rest control portion 11 to index the tool to the machining position.

The tool rest control portion 11 refers to the detailed data DAT2 corresponding to ② outside diameter rough machining from the tool name NA and the suffix DC designated in the machining program PRO, and reads out the indexing number KD "3" and the B-axis angle ANG "112°" for ② outside diameter rough machining of the complex tool 21 shown in the detailed data DAT2.

The tool rest control portion 11 drives and controls the tool driving motor (not shown) built in the tool rest. This drive and control is based on the read indexing number KD "3" and the B-axis angle "112°" concerning ② outside diameter rough machining so as to rotate the complex tool 21 around its axial center CT3. And, the complex tool 21 is positioned in the state that the indexing number KD is 3, as shown in FIG. 3(a). Furthermore, the B-axis driving motor (not shown) is driven so as to move and drive the tool rest 20 in the direction as shown by the arrows G and H of the B-axis direction. Then, the complex tool 21 is positioned so that the B-axis angle position is counter-clockwise 120° with respect to the Z-axis, as shown in FIG. 5(M3). In this state, the complex tool 21 is moved and driven in the direction as shown by the arrow A of the Z-axis direction so as to machine the outside diameter 17c of the rotating workpiece 17 a predetermined length L1 by the insert 25, as shown in FIG. 5(M3).

Subsequently, finishing machining is executed on an inside diameter 17d of the workpiece 17 of FIG. 6(M4) with the complex tool 21. In this case, the virtual tool is designated by inputting "GNL IN" as tool name NA, "E" as suffix DC in the machining program PRO. Then, main control portion 2 searches the tool data DAT of the tool file 7, and selects the corresponding tool, that is, the virtual tool which tool name NA is "GNL IN" and the suffix DC is "E", shown on the fifth from the upper of the figure which tool number TN is 1 as shown in ⑤ of FIG. 3(b), and instructs the tool rest control portion 11 to index the tool to the machining position.

The tool rest control portion 11 refers to the detailed data DAT2 corresponding to ⑤ inside diameter finishing machining from the tool name NA and the suffix DC designated in the machining program PRO, and reads out the indexing number KD "5" and the B-axis angle "0°" concerning ⑤ inside diameter finishing machining of the complex tool 21 shown in the detailed data DAT2.

The tool rest control portion 11 drives and controls the tool driving motor (not shown) built in the tool rest, the drive and control being based on the read indexing number "4" and the B-axis angle "0°" concerning ⑤ inside diameter finishing machining so as to rotate the complex tool 21 around its axial center CT3. And, the complex tool 21 is positioned in the state that the indexing number KD is 4, as shown in FIG. 3(a). Furthermore, the B-axis driving motor (not shown) is driven so as to move and drive the tool rest 20 in the direction as shown by the arrows G and H of the B-axis direction. Then, the complex tool 21 is positioned so that the B-axis angle position is 0° with respect to the Z-axis, that is, so as to be parallel, as shown in FIG. 6(M4). In this state, the complex tool 21 is moved and driven in the direction as shown by the arrow A of the Z-axis direction so as to machine the inside diameter 17d of the rotating workpiece 17 a predetermined length by the insert 26, as shown in FIG. 6(M4).

Figure 6:
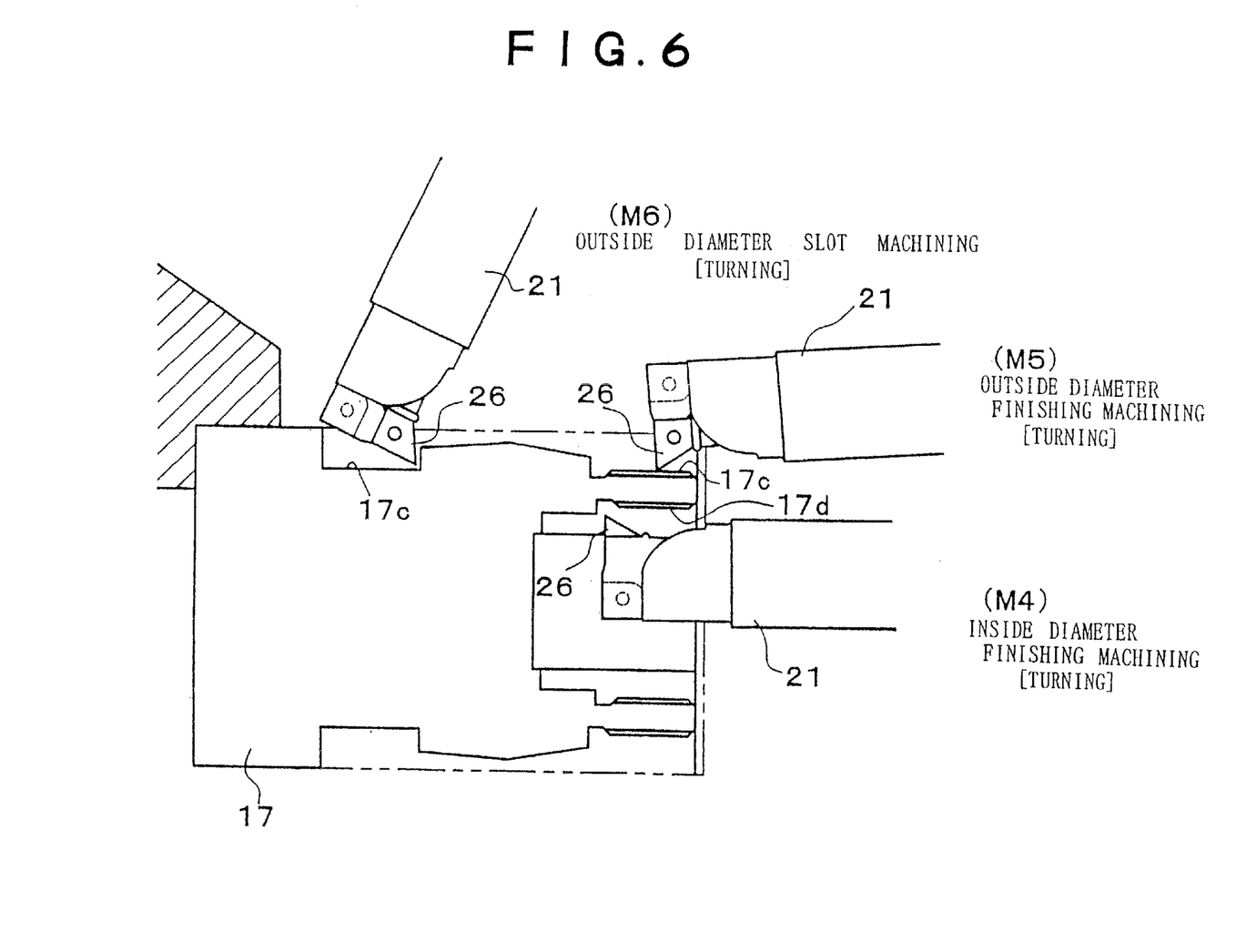
Figure 7:
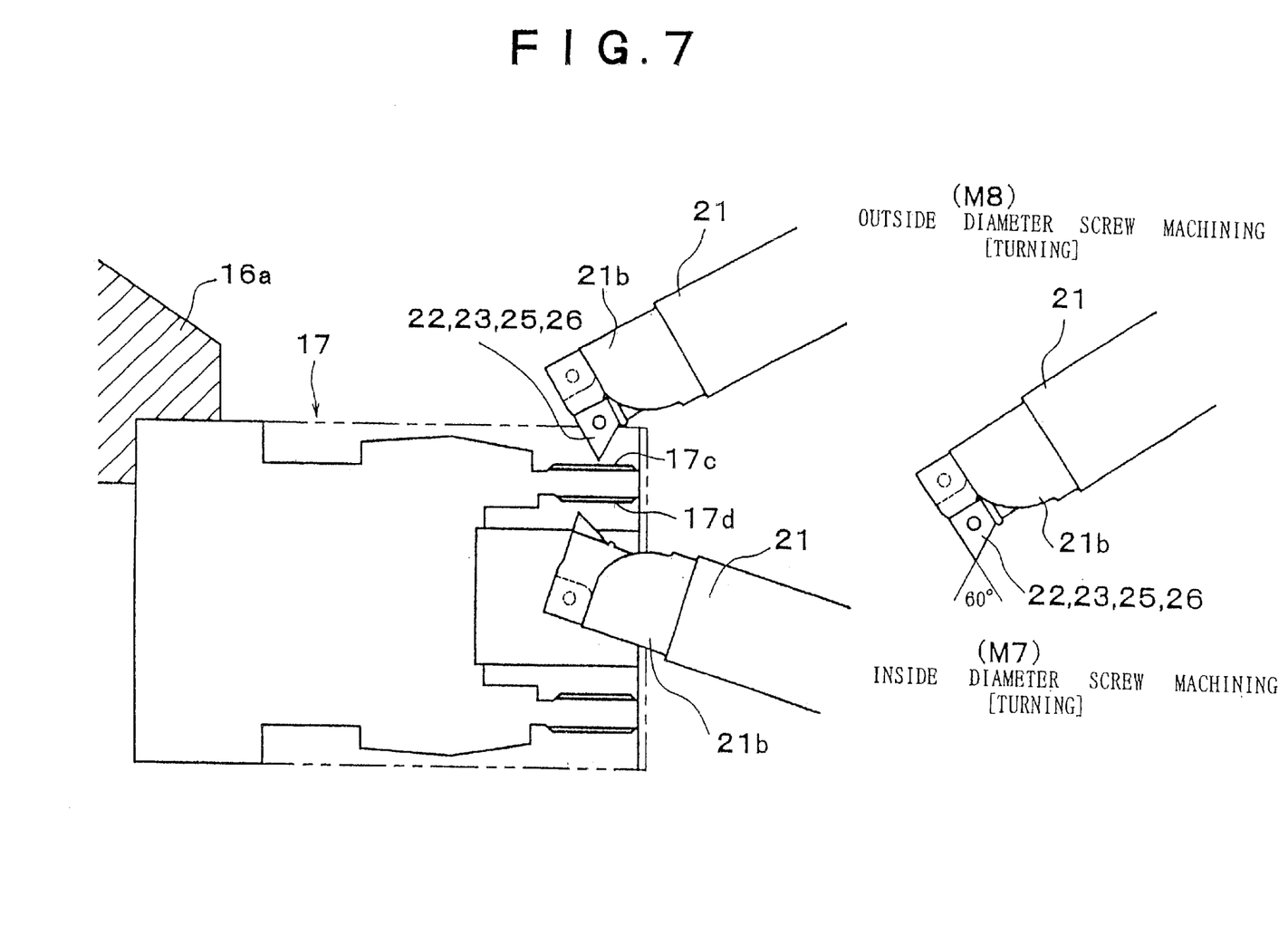

As shown in FIG. 6(M5), (M6) and FIG. 7 (M7), (M8) the respective inserts 22, 23, 25, 26 of the same complex tool 21 are rotated around the tool axial center CT3 on the basis of the tool data DAT stored in the tool file 7 so as to selectively index and position the insert to be used for machining. And, the tool rest is properly rotated and positioned in the direction of the B-axis angle so as to execute various kinds of machining, such as the outside diameter finishing machining as shown in FIG. 6(M5) the outside diameter slot machining as shown in FIG. 6(M6), the inside diameter screw machining as shown in FIG. 7(M7) and the outside diameter screw machining as shown in FIG. 7(M8) on the workpiece 17 by the respective inserts 22, 23, 25, 26. In this case, the virtual tools ① through ⑦ as shown in FIG. 3(c) are not used in a part of the sequence of machining operations concerning FIG. 6 and FIG. 7. But, in this case also, machining is executed using the virtual tool concerning the complex tool 21 of FIG. 4, as set and stored in the other part of the tool file 7. For instance, the virtual tool to be used for the outside diameter finishing machining of FIG. 6(M5) is one which tool number TN is 1 (identifying the complex tool 21), tool name NA is "GNL OUT", suffix DC is "K", indexing number KD is "2", B-axis angle is 5° in the tool file 7. Then, this is the machining operation with the insert 26.

Figure 8:
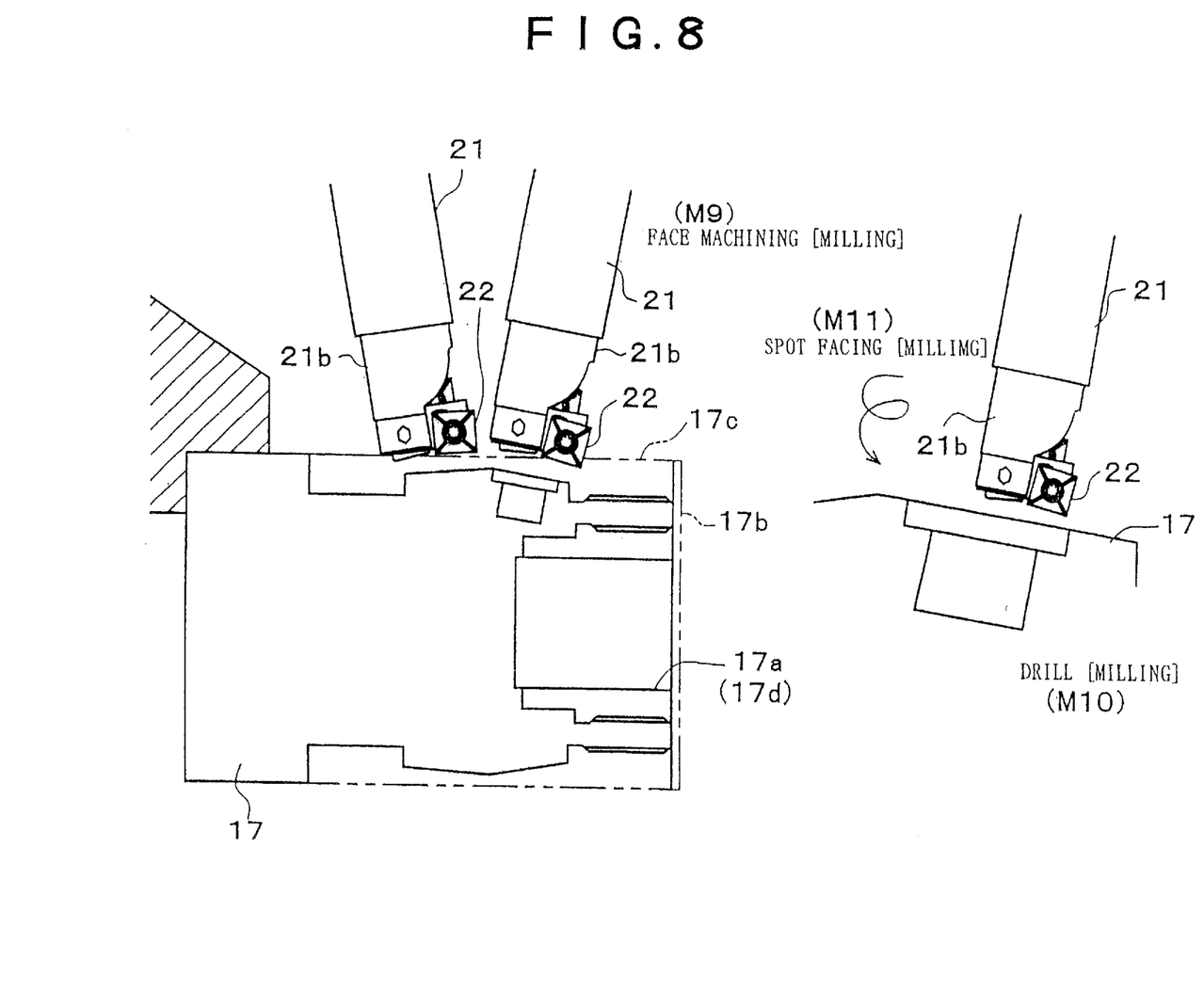

After turning machining is finished on the workpiece 17, milling machining as shown in FIG. 8(M9), (M1) and (M11) is executed. In this case also, (M9) face machining, (M10) drilling machining and (M11) spot facing machining are executed on the workpiece 17, using ⑥ milling drill and ⑦ end mill from among the virtual tools of complex tool 21, set in the tool file 7 of the complex tool 21. Both ⑥ milling drill and ⑦ end mill of the virtual tools are machining operations and tools with the insert 22, which indexing number is 1, as shown in FIG. 3(c). The milling machining operation is executed in such a manner that the workpiece 17 in the spindle is fixedly held around the Z-axis or is rotated with C-axis control while the complex tool 21 being rotated at high speed with the axial center CT2 as its center, changing the B-axis angle.

By machining according to the steps mentioned above, the workpiece, for instance, as shown in FIG. 2 can be cut and machined from a round bar, using one complex tool 21.

It is possible to have a case where the inserts 22, 23, 25, 26 of the respective virtual tools of the complex tool 21 and the workpiece 17 may interfere with each other due to the machining shape of the workpiece 17 and the machining steps undertaken, as shown in FIGS. 11(a), (c) (d). Each virtual tool is generally positioned by the tool rest 20 on the basis of the B-axis angle ANG as shown in ④ of FIG. 10, set in the detailed data DAT2 set in the tool file 7 concerning the virtual tool. But, for example in a case where the angle of a taper TP portion of the workpiece 17 exceeds the clearance angle ③ of the tool as shown in FIG. 11(a), or if there is an arc CT portion of the workpiece 17 as shown in FIGS. 11(b) and (c), there is no clearance angle between the virtual tool and the workpiece as shown in ③ of FIG. 10. The virtual tool and the workpiece 17 interfere with each other and preclude execution of certain machining sequences. Similarly, in a case where as shown in FIG. 11(e), the main body 21a of the complex tool 21 and the taper TP or the arc portion CT of the workpiece 17 interfere with each other also, proper machining cannot be executed.

To address and prevent the possibility of interference, the main control portion 2 simulates the programmed machining operations to test for possible problems using the simulation control portion 8 prior to machining an actual workpiece 17 with the complex tool using the machining program. The main control portion 2 causes a B-axis angle changing judging control portion 4 to judge or assess whether there will be interference between the workpiece and the virtual tool when machining is executed according to a sequence wherein each virtual tool is used as instructed in the machining program, keeping the B-axis angle ANG as a default value, in the detailed data DAT2 in the tool data TL set for the tool. The B-axis angle ANG, set as the default value, normally can be changed in case there is an impending interference.

Figure 9:
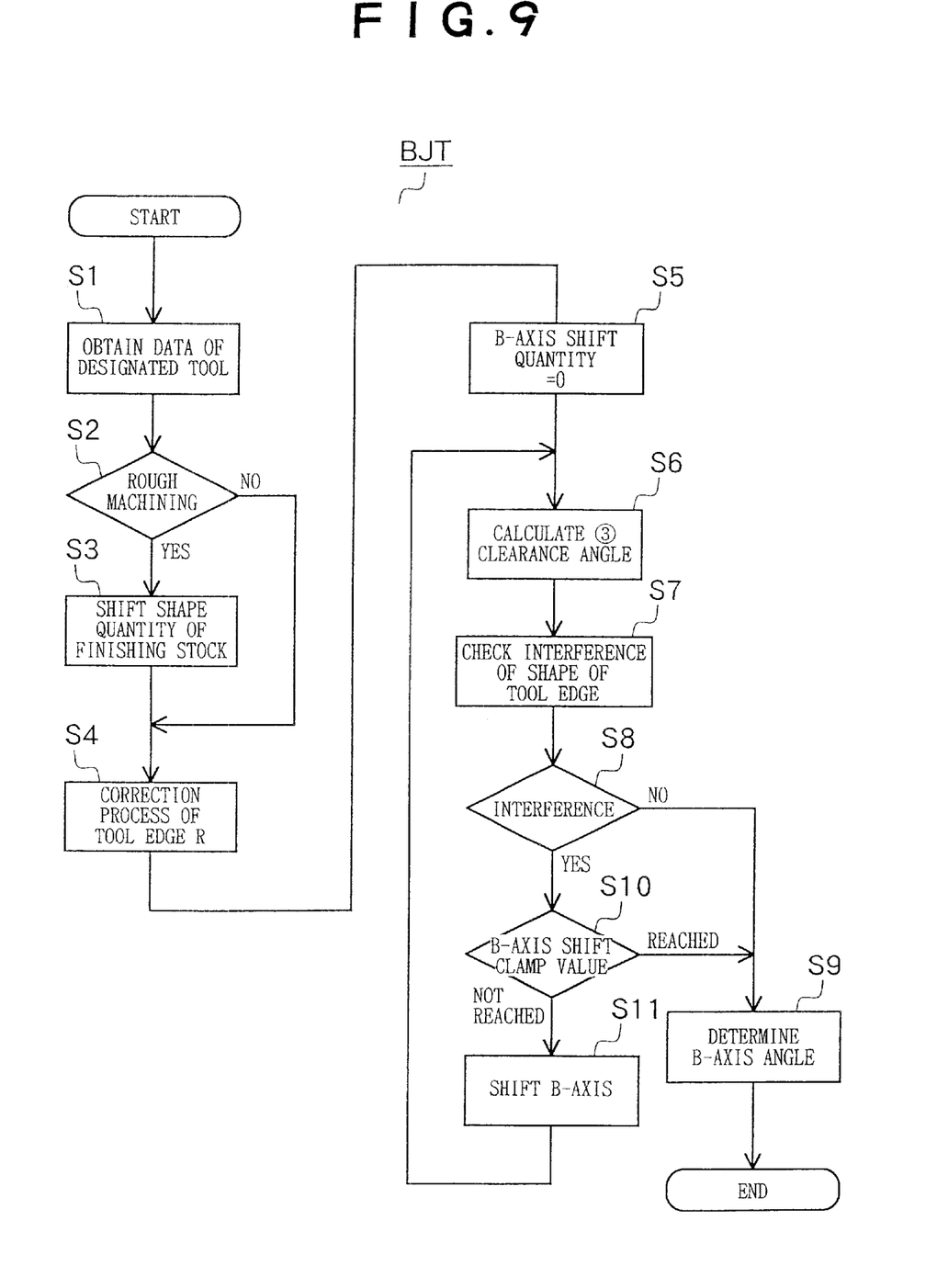
FIG. 9 is a flowchart showing an example of a B-axis angle determination program.
Figure 10:
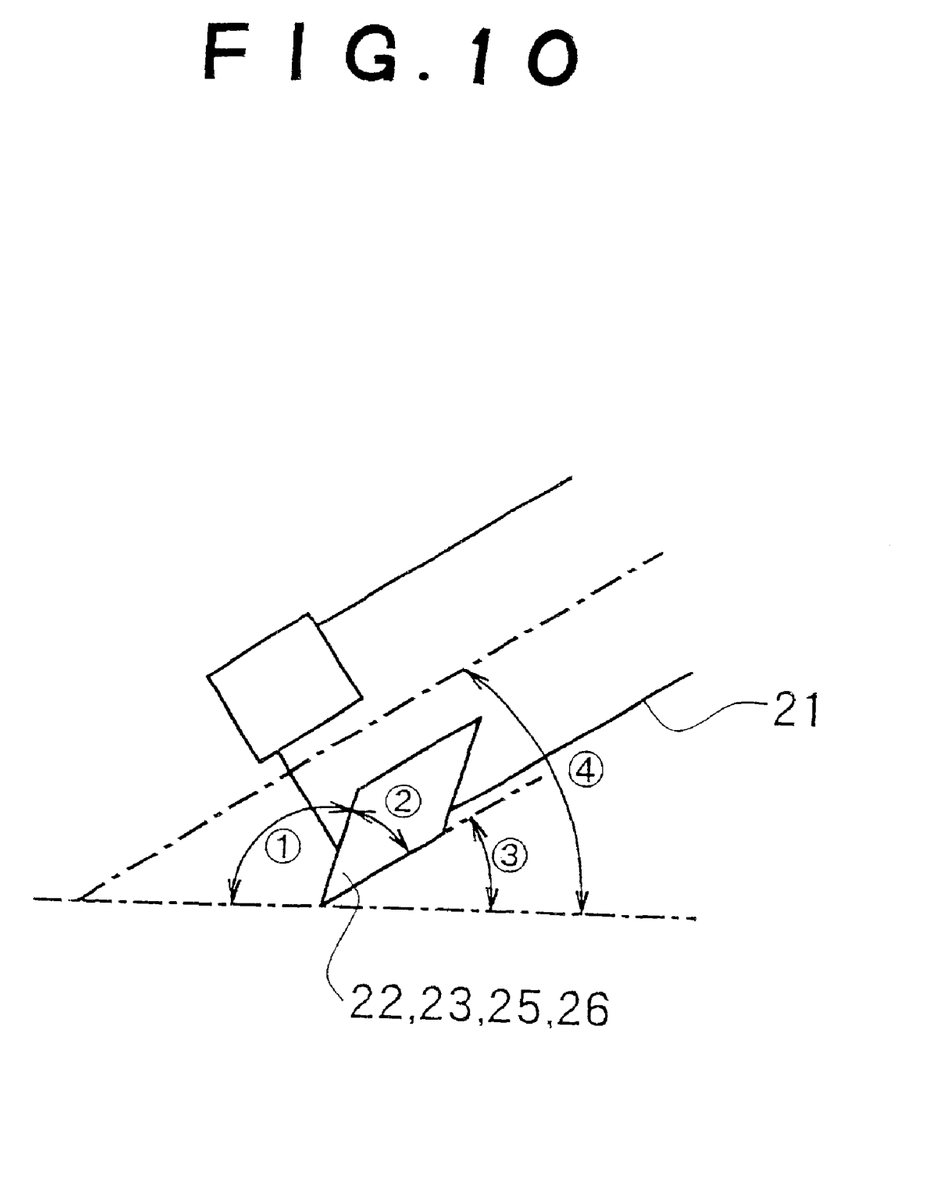
FIG. 10 is a view for explaining the state of the angle of a tool edge during machining.

That is, the B-axis angle changing judging control portion 4 executes the B-axis angle changing judging program BJP as shown in FIG. 9, and reads out the cutting angle in ① of FIG. 10 and the tool angle in ② of FIG. 10 for the virtual tool that has been selected by the machining program. The machining operation is simulated, for example using the corresponding detailed data DAT2 in the tool file 7 as shown in FIG. 3(b) so as to pass through step S1.

Subsequently, the program enters into step S2. The program tests whether or not the machining of the machining program simulated is rough machining. In case of rough machining, the finishing machining shape registered in the machining program is shifted by the amount of its finishing stock in step S3, and the machining shape formed by the rough machining is then set.

Next, the program enters into step S4, and corrects for tool edge R as known otherwise in the art. And, in step S5, the B-axis shift quantity is made 0, that is, the default value stored in the tool data DAT is adopted as the value of the B-axis angle. For instance, in case of FIG. 3(b), 112° is adopted as the B-axis angle ANG. Next, the clearance angle as shown in ③ of FIG. 10 is calculated at step S6. This clearance angle ③ is shown by the following expression.

clearance angle ③=180°−① cutting angle−② tool angle+B-axis shift quantity

After the clearance angle ③ is thus obtained, the program judges whether or not there will be interference between the workpiece and the virtual tool to be used for machining, namely at simulating step S8.

Figure 11:
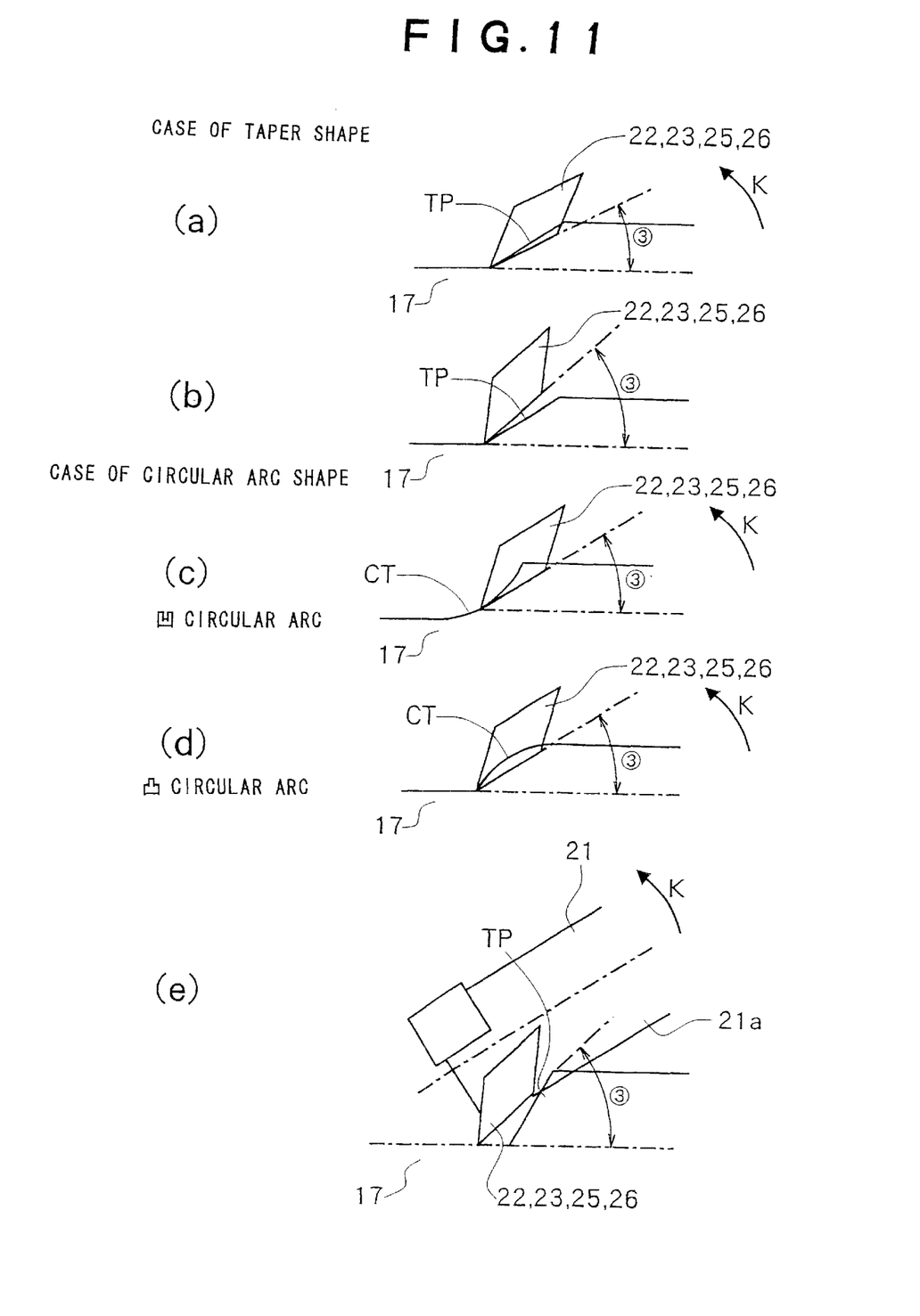
FIGS 11a–11e is a view for showing a situation in which a tool edge and workpiece interfere with each other.

When the clearance angle ③ is sufficient and the interference between the workpiece and the virtual tool to be used for machining (the complex tool 21) does not occur during simulation, the program enters into step S9. The default value is adopted as the B-axis angle ANG without alteration, and actual machining is executed with the default value. But, in case where the clearance angle ③ is short and during simulation interference occurs between the workpiece and the virtual tool programmed to be used for machining (the complex tool 21), as shown in FIGS. 11(a), (c), (d) and (e), then the program enters into step S10. The B-axis angle can be adjusted but as a further step the program judges whether or not the B-axis shift value reaches a predetermined maximum or clamp value (mentioned hereinafter). If the maximum is not reached, the B-axis angle ANG is shifted a predetermined quantity in the direction as shown by the arrows G and H of FIG. 1 which is the B-axis direction, so as to move the insert away from the workpiece 17 and ameliorate the interference. The complex tool 21 can be moved and tested in increments of 5°, for example, in the direction where the inserts 22, 23, 25, 26 are moved farther away from the workpiece 17, that is, in the arrow K direction of FIG. 11. This can allow the program to proceed while avoiding interference between the workpiece and the insert.

In this state, the step 6 and the subsequent steps are repeated. The complex tool 21 is rotated a predetermined angular amount in a direction away from the workpiece 17, as already mentioned. Therefore, the probability of interference between the workpiece and the virtual tool is lower than with the last simulation. Whether or not there will be interference between the workpiece and the virtual tool is judged again in step S8. In case where no interference is foreseen as shown in FIG. 11(b), the program enters into step S9 from step S8. The B-axis angle is changed into the value shifted a predetermined quantity as the B-axis angle ANG at the time of actual machining and its value is determined.

In case where there is still interference expected between the workpiece 17 and the virtual tool after shifting of the B-axis angle ANG at step S8, the B-axis angle ANG is further shifted in the direction as shown by the arrows G and H of FIG. 1 which is the B-axis direction, again progressing in the direction where the inserts 22, 23, 25, 26 are to be moved farther from the workpiece 17 via step 10 and step 11. This is repeated until no interference is judged at step S8.

By doing so, the B-axis angle ANG is gradually moved in the direction opposite to the workpiece 17. But, in case where the B-axis angle ANG is widely changed in comparison with the initial default value, there is a danger of introducing other interference or hindrance on the execution of the machining with the virtual tool. So, the maximum shift quantity of the B-axis angle shifted from the default value of the B-axis angle ANG at step S11 can be limited to a constant maximum value. In case where the interference between the workpiece and the virtual tool is judged at step S8 in such a state that the B-axis angle is changed into the B-axis angle ANG adding the maximum shift quantity to the B-axis angle ANG at step S11, the judgment that the shift quantity with respect to the B-axis angle ANG reaches the maximum value, that is, reaches the clamp value is done at step S10. Then, the program enters into step S9, and the B-axis angle ANG is determined with the clamp value. In this case, the interference between the workpiece and the virtual tool has not been obviated. Then, the main control portion 2 outputs the alarm to the display 12 and notifies the operator that it is necessary to consider a change of tools.

The invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

We claim:

1. A complex machining machine tool having a tool rest capable of attachably and detachably receiving a complex tool having a plurality of inserts thereon, the complex tool being capable of a plurality of kinds of machining operations on a workpiece by selectively indexing and using a selected one of said inserts on said complex tool, said complex machining machine tool comprising:

a spindle rotatably supported and defining a Z-axis as its center;

said tool rest being free to move and drive in an X-axis direction perpendicular to said Z-axis, and being free to rotate, position and drive in a B-axis direction with a Y-axis perpendicular to said X-axis and Z-axis as its center;

a tool file storing tool data concerning said complex tool to be used in a machining program;

said complex tool being registered in said tool file as a plurality of virtual tools;

a plurality of said virtual tools being virtually set concerning said complex tool, the virtual tools corresponding to machining operations that are capable of being executed with said complex tool;

said virtual tools including a turning tool and a milling tool;

said tool data being stored for every said virtual tool;

said tool data including an angle in said B-axis direction concerning each said virtual tool at which angle said virtual tool is positioned when said virtual tool is used; and machining executing means reading out the tool data corresponding to a virtual tool from said tool file on the basis of programmed machining instructions for use of said virtual tool according to a stored machining program and for executing the stored machining program with said virtual tools of said complex tool being set and selected on the basis of said tool data.

2. The complex machining machine tool as set forth in claim 1, wherein tool lengths concerning said complex tool are respectively stored for each insert of the complex tool.

3. The complex machining machine tool as set forth in claim 1, further comprising interference occurrence judging means operable for judging whether interference can be expected between a workpiece to be machined and said virtual tools by simulating execution of the machining program to be executed, and wherein a B-axis angle changing means is provided for changing the B-axis angle concerning said virtual tool stored in said tool data so as to shift the B-axis angle to be used, by a predetermined amount, and to move said complex tool away from said workpiece and prevent said interference.

4. The complex machining machine tool as set forth in claim 3, wherein said B-axis angle changing means is limited for controlling an extent of shifting of the B-axis angle by said B-axis angle changing means, so as not to shift by more than a maximum shifting quantity.

* * * * *